US010797864B2

(12) United States Patent
Tang et al.

(10) Patent No.: US 10,797,864 B2
(45) Date of Patent: Oct. 6, 2020

(54) SYSTEM AND METHOD FOR AUTHENTICATING DATA WHILE MINIMIZING BANDWIDTH

(75) Inventors: Lawrence Tang, San Diego, CA (US);
Kenneth P. Miller, Poway, CA (US);
Christopher J. Bennett, San Diego, CA (US)

(73) Assignee: Combined Conditional Access Development And Support, LLC, San Diego, CA (US)

( * ) Notice: Subject to any disclaimer, the term of this patent is extended or adjusted under 35 U.S.C. 154(b) by 0 days.

(21) Appl. No.: 13/301,219

(22) Filed: Nov. 21, 2011

(65) Prior Publication Data
US 2013/0129080 A1 May 23, 2013

(51) Int. Cl.
*H04L 9/28* (2006.01)
*H04L 9/08* (2006.01)

(52) U.S. Cl.
CPC .......... *H04L 9/0816* (2013.01); *H04L 9/0822* (2013.01); *H04L 9/0866* (2013.01)

(58) Field of Classification Search
CPC ... H04L 9/0816; H04L 9/0822; H04L 9/0866; H04L 9/083
USPC ............... 380/28, 45; 713/171, 181
See application file for complete search history.

(56) References Cited

U.S. PATENT DOCUMENTS

| | | | | |
|---|---|---|---|---|
| 5,265,164 A * | 11/1993 | Matyas | ............... | G06F 9/30003 380/2 |
| 6,687,375 B1 * | 2/2004 | Matyas, Jr. | ........... | H04L 9/0866 380/30 |
| 6,775,772 B1 * | 8/2004 | Binding et al. | ............... | 713/171 |
| 7,941,663 B2 * | 5/2011 | Sarikaya | ........................ | 713/169 |
| 8,386,800 B2 * | 2/2013 | Kocher et al. | ................ | 713/189 |
| 8,437,473 B2 * | 5/2013 | Gantman et al. | ............... | 380/44 |
| 8,571,223 B2 * | 10/2013 | Du et al. | ........................ | 380/278 |
| 8,745,372 B2 * | 6/2014 | Orsini et al. | .................. | 713/151 |
| 2002/0165824 A1 * | 11/2002 | Micali | ..................... | G06Q 20/02 705/50 |
| 2003/0166397 A1 * | 9/2003 | Aura | .............................. | 455/410 |
| 2004/0039908 A1 * | 2/2004 | Rose et al. | ..................... | 713/168 |
| 2005/0257044 A1 * | 11/2005 | Patrick | .......................... | 713/155 |
| 2006/0050870 A1 * | 3/2006 | Kimmel et al. | ................. | 380/30 |
| 2006/0079206 A1 * | 4/2006 | Kim | ......................... | H04L 12/12 455/411 |
| 2006/0106727 A1 * | 5/2006 | Yellai | ...................... | G06F 21/10 705/59 |
| 2007/0180247 A1 * | 8/2007 | Leech | .......................... | 713/171 |
| 2008/0317248 A1 * | 12/2008 | Naono et al. | ................. | 380/255 |
| 2009/0103731 A1 * | 4/2009 | Sarikaya | ........................ | 380/270 |
| 2009/0199002 A1 * | 8/2009 | Erickson | ............... | H04L 9/3236 713/171 |
| 2009/0214028 A1 * | 8/2009 | Schneider | ........................ | 380/44 |
| 2010/0042839 A1 * | 2/2010 | Ho | ........................ | H04L 9/0841 713/169 |
| 2010/0262829 A1 * | 10/2010 | Brown | ................... | H04L 63/061 713/171 |

(Continued)

*Primary Examiner* — Tongoc Tran
(74) *Attorney, Agent, or Firm* — Ballard Spahr LLP

(57) ABSTRACT

Systems and methods for data authentication can comprise processing a first secret element to generate a first encrypted secret element, processing a second secret element to generate a non-secret element, and processing the first encrypted secret element and the non-secret element to generate an encrypted data block.

20 Claims, 8 Drawing Sheets

(56) References Cited

U.S. PATENT DOCUMENTS

| | | | | |
|---|---|---|---|---|
| 2011/0010770 | A1* | 1/2011 | Smith | G06F 21/71 726/18 |
| 2011/0083019 | A1* | 4/2011 | Leppard | H04L 9/002 713/189 |
| 2011/0116635 | A1* | 5/2011 | Bar-El | 380/278 |
| 2011/0252234 | A1* | 10/2011 | De Atley | H04L 9/0891 713/165 |
| 2011/0252243 | A1* | 10/2011 | Brouwer | H04L 9/0838 713/189 |
| 2011/0271099 | A1* | 11/2011 | Preiss | H04L 63/0807 713/155 |
| 2011/0271105 | A1* | 11/2011 | Shamir | G08B 13/2417 713/168 |
| 2011/0286596 | A1* | 11/2011 | Gressel | H04L 9/0637 380/268 |
| 2011/0307953 | A1* | 12/2011 | Kruglick | 726/22 |
| 2012/0011360 | A1* | 1/2012 | Engels et al. | 713/166 |
| 2012/0060031 | A1* | 3/2012 | Huang | H04L 9/083 713/168 |
| 2012/0243541 | A1* | 9/2012 | Zhao et al. | 370/392 |
| 2013/0014216 | A1* | 1/2013 | Lawrence | H04B 7/18593 726/3 |
| 2013/0024689 | A1* | 1/2013 | Liu | H04L 9/0822 713/168 |
| 2013/0044878 | A1* | 2/2013 | Rich | H04L 63/062 380/277 |
| 2013/0086385 | A1* | 4/2013 | Poeluev | 713/176 |

* cited by examiner

US 10,797,864 B2

SYSTEM AND METHOD FOR AUTHENTICATING DATA WHILE MINIMIZING BANDWIDTH

BACKGROUND

In a system where a data source contains distinct information for subsets of the overall recipient population, it is necessary to provide authentication information for each subset. Similarly, in the case where the transmission side of a system has incomplete knowledge of subsets of the overall recipient population, it is necessary to provide authentication information for each subset. As the number of subsets increases, the size and possibly the number of messages needing to be sent to each recipient unit in the field increases. Not only does this increase the bandwidth usage on the network, it can also slow the process of updating the devices in the field.

SUMMARY

It is to be understood that both the following summary and the following detailed description are exemplary and explanatory only and are not restrictive, as claimed. Provided are methods and systems for authenticating data while minimizing bandwidth. In an aspect, a changing secret value can be used to generate a non-secret value that is a function of the secret value, whereby a recipient device can verify the non-secret value to effect authentication of an underlying data. As an example, the non-secret value can be a universal value for processing by various recipient devices, wherein the universal non-secret value minimizes the bandwidth required to deliver an authenticator to the entire population of recipient devices.

In an aspect, a method for generating authentication data can comprise processing a first secret element to generate a first encrypted secret element, processing a second secret element to generate a non-secret element, and processing the first encrypted secret element and the non-secret element to generate an encrypted data block.

In an aspect, a method for generating authentication data can comprise encrypting a first shared key to generate an encrypted first shared key, encrypting a second shared key to generate an encrypted second shared key, processing the second shared key to generate a shared key nonce, and processing the first encrypted shared key, the second encrypted shared key, and the shared key nonce to generate an encrypted data block.

In an aspect, a method for authentication can comprise processing a data block to determine a shared key nonce, processing the data block to determine a shared key associated with a first identifier, wherein the data block comprises a plurality of encrypted shared keys, generating a first authentication key based upon the shared key, generating an authentication nonce using the first authentication key, and comparing the authentication nonce to the shared key nonce to determine authentication.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
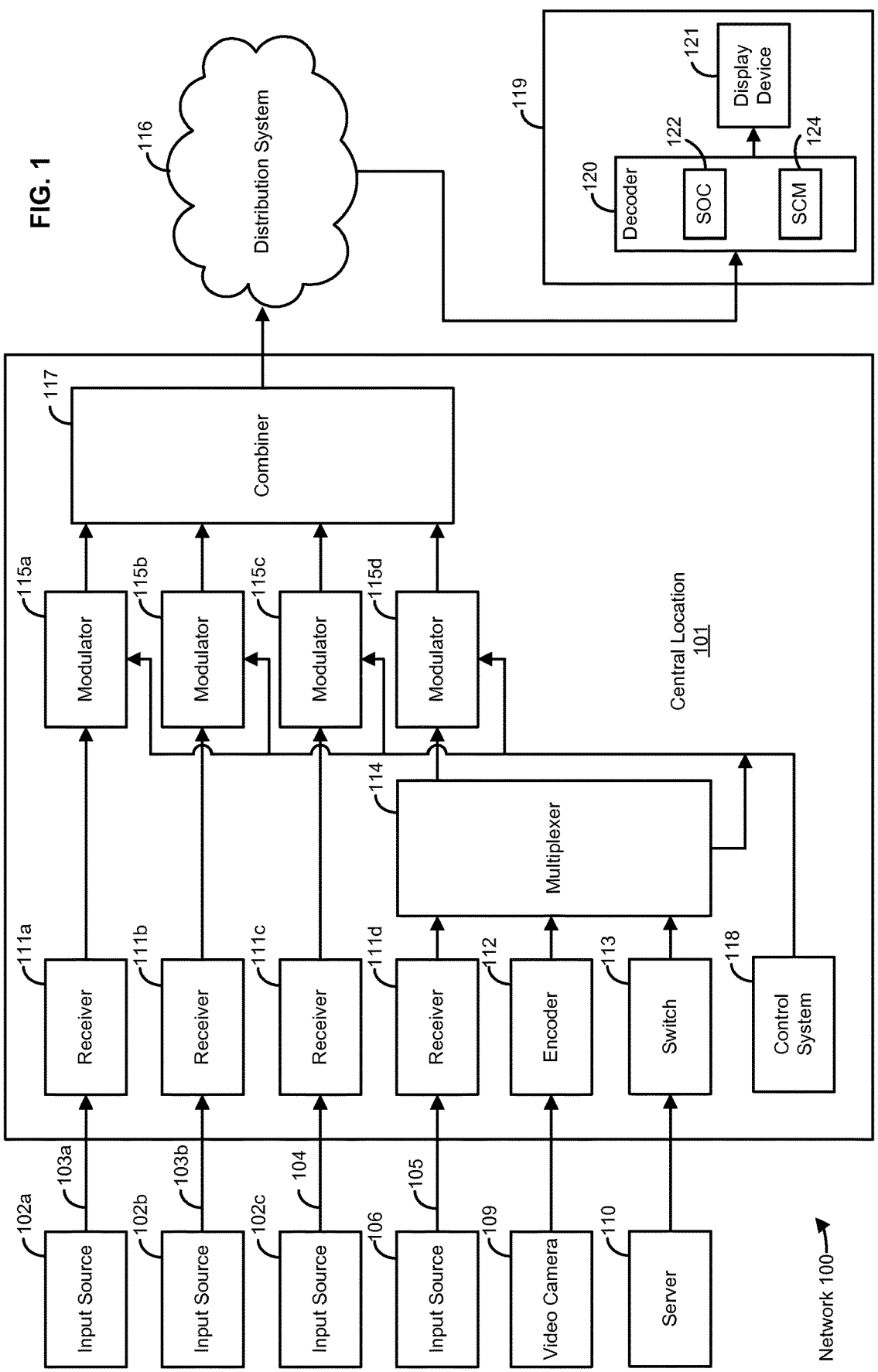
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system can be configured to authenticate data in a content delivery environment. However, other data in various environments and domains can be authenticated using the systems and methods described herein.

FIG. 1 illustrates various aspects of an exemplary network environment in which the present methods and systems can operate. The present disclosure relates to systems and methods for authenticating data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content may also be created at the central location 101. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be, for example, a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115a, 115b, 115c, and 115d, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device 121, such as on a television set (TV), mobile device, or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more decoders 120, display devices 121, central locations 101, DVR's, home theater PC's, and the like.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, the decoder 120 can comprise a system on a chip (SOC) 122 such as an integrated circuit that implements the requirements associated with the decoder 120. As an example, the SOC 122 can be configured to implement various signal processing and authentication procedures necessary to decode digital signals in a cable network. In an aspect, the SOC 122 can have a particular SOC type associated therewith. As an example, the SOC type can be an identifier for a particular SOC or a set of SOCs. As a further example, the SOC type can comprise a key hierarchy design and a value of a pre-defined control word protection key (CWPK). However, other identifiers can be used.

In an aspect, a software module 124 can be executed by the SOC 122. As an example, the software module 124 can be stored in a tamper-resistant memory of the SOC 122. In an aspect, the software module 124 can be responsible for authenticating authorization data, verifying an authorization status of the decoder 120, and loading encrypted control words and related data on the basis of the authorization status of the decoder 120. As an example, the software module 124 can be an authenticated secure code module (SCM). As a further example, the software module 124 can be designed for a particular SOC, SOC type, SOC classification, decoder, or the like. However, other modules can be used.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, MPEG-4, and subsequent MPEG standards are hereinafter referred to as MPEG. In an MPEG encoded transmission, content and other data are transmitted in packets, which collectively make up a transport stream. In an exemplary aspect, the present methods and systems can employ transmission of MPEG packets. However, the present methods and systems are not so limited, and can be implemented using other types of transmission and data.

The output of a single MPEG audio and/or video coder can be a transport stream comprised of one or more elementary streams. An elementary stream is an endless near real-time signal. For convenience, the elementary stream may be broken into data blocks of manageable size, forming a packetized elementary stream (PES). These data blocks can rely on header information to identify the start of the packets and can include time stamps because packetizing disrupts the time axis. For transmission and digital broadcasting, for example, several programs and their associated PESs can be multiplexed into a multi-program transport stream. A multi-program transport stream has a program clock reference (PCR) mechanism that allows transmission of multiple clocks, one of which is selected and regenerated at the decoder.

A multi-program transport stream is more than just a multiplex of data, audio, and/or video PESs. In addition to the compressed audio, video and data, a transport stream can include metadata describing the bit stream. This includes the program association table (PAT) that lists every program in the multi-program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi-program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. The receiver can discard the contents of all other PIDs.

The multi-program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

In an aspect, Conditional Access information can provide a permission for the decoder 120 to access a service or particular programming subject to content protection. For example, the Conditional Access information can comprise a set of rights that allows the decoder 120 to access any service which requires possession of at least one of the rights granted by the Conditional Access information. As a further example, rights may be package rights or base rights. In an aspect, package rights can be a right representing access to a set of services. In an aspect, a base right can be a right which is not a package right. As an example, base rights can represent access to an individual service such as special programming, pay-per-view programming, or add-on subscription.

Figure 2:
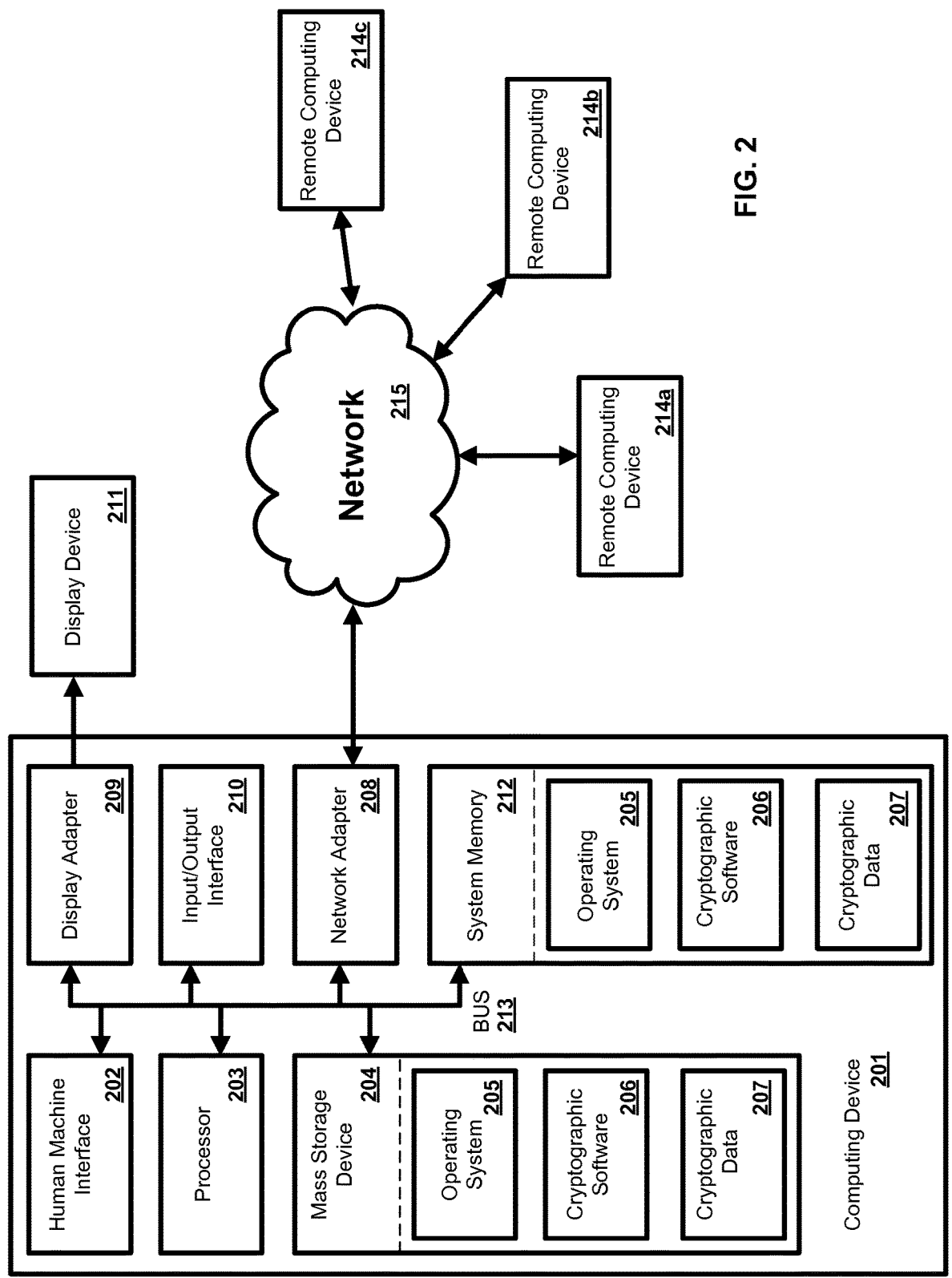
FIG. 2 is a block diagram of an exemplary computing system.

As described in greater detail below, the methods and systems can be implemented on a computing device 201 as illustrated in FIG. 2 and described below. By way of example, server 110 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, cryptographic software 206, cryptographic data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as authentication data 207 and/or program modules such as operating system 205 and authentication software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and cryptographic software 206. Each of the operating system 205 and cryptographic software 206 (or some combination thereof) can comprise elements of the programming and the cryptographic software 206. Cryptographic data 207 can also be stored on the mass storage device 204. Cryptographic data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, the cryptographic data 207 can be stored on a secure chip to ensure that the cryptographic data 207 is not externally readable.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computing device 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computing device 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of cryptographic software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

As described in greater detail below, authentication of the right identifiers assigned to a particular decoder 120 can be implemented by the system and methods described herein. However, authentication of other rights and data can be implemented by the systems and methods.

Figure 3:
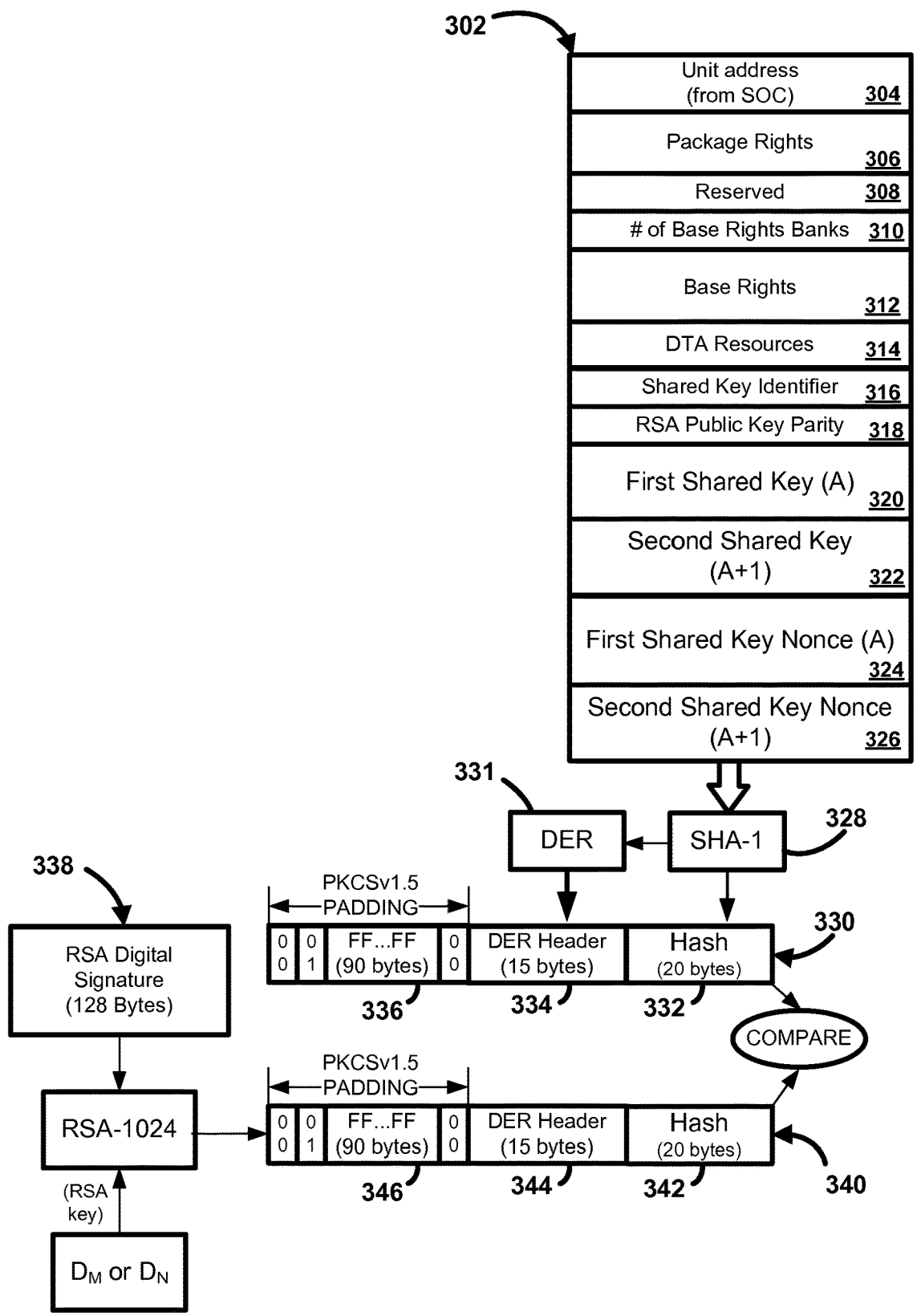
FIG. 3 is a block diagram of an exemplary data and data flow.

FIG. 3 illustrates an exemplary data flow. In an aspect, a data block 302 can comprise Conditional Access information for controlling rights associated with a particular decoder 120. As an example, a data block 302 can comprise a unit address 304, package rights 306, reserved entry 308, base rights bank identifier 310, base rights 312, DTA resources 314, shared key identifier 316, public key parity 318, a first shared key 320, a second shared key 322, a first shared key nonce 324, a second shared key nonce 326.

As an example, at least a portion of the data block 302 can be populated from information transmitted in a unit authorization message (UAM). In an aspect, when the data block 302 is populated from a UAM, the data block can include the first shared key 320 and the second shared key 322 in an encrypted state and no shared key nonces. Other transport methods and messages can be used to deliver the data block 302 such as a security messaging protocol (SMP) message, a common key message (CKM), and the like. In an aspect, when the data block 302 is populated from a CKM, the data block can include the first shared key nonce 324 and the second shared key nonce 324 and no shared keys. As a further example, the data block 302, in whole or in part, can be transmitted to the decoder 120 to deliver an authenticated set of rights to the decoder 120 for accessing certain services or content.

In an aspect, the data block 302 can comprise content protection rights which are processed by a recipient device (e.g., decoder 120, DTA, universal DTA, and the like) to control access to content. Accordingly, the data block 302 can comprise an authenticator (e.g., one or more of the first shared key 320, second shared key 322, first shared key nonce 324, second shared key nonce 326, and the like) for validating the enabling or disabling of resources in the recipient device and ensuring that the rights and resources are aligned with the current shared keys. As an example, recipient devices comprising Class 1 SOCs, can perform message authentication by an application code of the recipient device to verify a digital signature over a UAM. As a further example, for recipient devices comprising Class 2 SOCs, the authentication can be performed by the SCM 124 within a secure area of the SOC 122.

In an aspect, the authenticator can be a PKCSv2.1 signature distributed to the recipient devices in a UAM. As an example, the authenticator can be updated whenever the rights assigned to the (U)DTAs are changed, whenever resources are enabled or disabled, whenever a new encrypted shared key is distributed, and in the event that it is necessary to change the RSA key needed to process the authenticator.

In an aspect, the authenticator is based on one or more encrypted shared keys transmitted in a broadcast message, for example. However, the encrypted shared keys can be transmitted via a CKM and the authenticator can be based on one or more shared key nonces for authentication of a variety of recipient devices.

In an aspect, the unit address 304 can be an identifier associated with a particular SOC 122 or processor. As an example, the unit address 304 can comprise a five byte identifier. However, other identifiers having various sizes and lengths can be used. As an example, a particular SOC 122 can implement a particular method of processing a data, such as the data block 302, by the SOC 122. In an aspect, the unit address 304 can be used to differentiate one SOC 122 from another SOC 122 for locating and processing procedures.

In an aspect, the package rights 306 can comprise information relating to a right or rights representing access to a set of services, content items, and/or programs. As an example, the set of services can comprise a group of programs, each program represented by a particular content channel. As a further example, the package rights 306 can be configured based upon a set of programs or channels available to the recipient device.

As an example, the package rights 306 can be expressed as a character string. As an example, the package rights 306 can comprise a bit vector. As a further example, the package rights 306 can comprise a bit vector having a length of thirty-two bytes. However, other bit expressions having other lengths can be used to represent the package rights 306.

In an aspect, the reserved entry 308 can comprise 1 byte of the overall data block 302 that can be used as a holding place or for various data entries. However, any number of bytes can be reserved in the data block 302. In an aspect, the base rights bank identifier 310 can represent a number of base rights entries or banks that are included in the data block 302. As an example, the base rights bank identifier 310 can comprise a one byte identifier. However, other identifiers, characters, strings, and the like, having various lengths, can be used.

In an aspect, the base rights 312 can comprise information relating to a right other than a package right. As an example, the base rights 312 can represent information related to conditional access to an individual service, content item, and/or program. As an example, the individual services can comprise a particular programming associated with a particular content channel. As a further example, the base rights 312 can be configured based upon a special programs or channel available to the recipient device such as a pay-per-view channel. In an aspect, the base rights 312 can comprise a bit vector. As an example, the base rights 312 can comprise a bit vector having a length of three hundred twenty bytes. However, other bit expressions having other lengths can be used to represent the base rights 312.

In an aspect, the decoder resources 314 can comprise data for use by a particular recipient such as the decoder 120. As an example, the decoder resources 314 can comprise information relating to capabilities possessed by recipient devices such as the ability to decode high definition (HD) video, or the ability to output content across a particular interface such as high definition multimedia interface (HDMI), for example. Other resources and information relating to recipient devices can be stored.

In an aspect, the shared key identifier 316 can comprise a character or characters (e.g., sequence number) used by a processor (e.g., the decoder 120, the SOC 122, the software module 124, etc.) to identify a shared key and values associated with the shared key. In an aspect, the shared key identifier 316 can be used to distinguish one shared key from other shared keys. As an example, the shared key identifier 316 can be used by a processor to apply the appropriate shared key to a particular data for processing such as encryption, decryption, authentication, and the like.

In an aspect, the public key parity 318 can comprise an identifier to indicate a select public key to be used in authentication. As an example, the public key parity 318 can be an identifier such as a character (e.g., M or N). In an aspect, the public key parity 318 is a bit value (e.g., 0 or 1). As a further example, the public key parity 318 can be used by a processor to apply the appropriate public key to particular data for processing such as encryption, decryption, authentication, and the like.

In an aspect, the first shared key 320 can comprise a symmetric secret key. In an aspect, the first shared key 320 (e.g., in an encrypted state) can be associated with a particular SOC 122, a type/class of SOC 122, a particular process, or the like. As an example, the first shared key 320 can be used to encrypt/decrypt other secret keys such as control words used to encrypt and decrypt the payloads of MPEG transport packets. The first shared key 320 can be used to encrypt/decrypt any data and/or keys. As a further example, the first shared key 320 can be encrypted/decrypted for security, authentication, integrity, and the like, using a protection key such as a SOC type protection key (STPK), a unique protection key (UPK), a control word protection key (CWPK), and the like. In an aspect, the protection key used to encrypt/decrypt the first shared key 320 can be associated with a particular SOC 122 or type/class of SOC 122. As an example, the first shared key 320 can be protected using the UPK Protection Method and delivered in a UAM. However, other secret and non-secret keys can be used to encrypt/decrypt the first shared key 320.

In an aspect, the second shared key 322 can comprise a symmetric secret key. In an aspect, the second shared key 322 (e.g., in an encrypted state) can be associated with a particular SOC 122, a type/class of SOC 122, a particular process, or the like. In an aspect, the second shared key 322 can be different from the first shared key 320. As an example, the second shared key 322 can be used to encrypt/decrypt symmetric other secret keys such as control words used to encrypt and decrypt the payloads of MPEG transport packets. The second shared key 322 can be used to encrypt/decrypt any data and/or keys. As a further example, the second shared key 322 can be encrypted/decrypted for security, authentication, integrity, and the like, using a protection key such as a SOC type protection key (STPK), a unique protection key (UPK), a control word protection key (CWPK), and the like. In an aspect, the protection key used to encrypt/decrypt the first shared key 320 can be associated with a particular SOC 122 or type/class of SOC 122. As an example, the second shared key 322 can be protected using the UPK Protection Method and delivered in a UAM. However, other secret and non-secret keys can be used to encrypt/decrypt the second shared key 322.

In an aspect, the first shared key nonce 324 can comprise a non-secret value associated with a shared key, such as the first shared key 320, and used to authenticate possession of the shared key. In an aspect, the first shared key nonce 324 can be an arbitrary number used to sign a cryptographic communication. As an example, the first shared key nonce 324 can be a random or pseudo-random number issued in an authentication protocol to ensure that old communications cannot be reused in replay attacks. As a further example, the first shared key nonce 324 can be a progressively changing value, changing based upon a pre-defined time period. In an aspect, the first shared key nonce 324 is a function of a shared key and the modulus of an RSA public key. In an aspect, the first shared key nonce 324 can be associated with a Shared Key that is protected using the STPK Protection Method, and delivered in a Common Key Message (CKM), which is a broadcast message. As an example, separate encrypted Shared Keys protected using the STPK protection method are delivered for each type of recipient device (e.g., SOC Type). As a further example, the first shared key nonce 324 can be a value associated with the Shared Keys, which is common to all recipient devices regardless of the type.

Accordingly, the first shared key nonce 324 can be transmitted as a universal authenticator, thereby minimizing the need for a plurality of data blocks delivered for each type of recipient device. Therefore, a required bandwidth for the transmission of authentication information is minimized.

In an aspect, the second shared key nonce 326 can comprise a non-secret value associated with a shared key, such as the second shared key 322, and used to authenticate possession of the shared key. In an aspect, the second shared key nonce 326 can be an arbitrary number used to sign a cryptographic communication. As an example, the second shared key nonce 326 can be a random or pseudo-random number issued in an authentication protocol to ensure that old communications cannot be reused in replay attacks. As a further example, the second shared key nonce 326 can be progressively changing value, changing based upon a pre-defined time period. As a further example, the second shared key nonce 326 can be a progressively changing value, changing based upon a pre-defined time period. In an aspect, the second shared key nonce 326 is a function of a shared key and the modulus of an RSA public key. In an aspect, the second shared key nonce 326 can be associated with a Shared Key that is protected using the STPK Protection Method, and delivered in a Common Key Message (CKM), which is a broadcast message. As an example, separate encrypted Shared Keys protected using the STPK protection method are delivered for each type of recipient device (e.g., SOC Type). As a further example, the second shared key nonce 326 can be a value associated with the Shared Keys, which is common to all recipient devices regardless of the type. Accordingly, the second shared key nonce 326 can be transmitted as a universal authenticator, thereby minimizing the need for a plurality of data blocks delivered for each type of recipient device. Therefore, a required bandwidth for the transmission of authentication information is minimized.

In an aspect a hash algorithm 328 can be applied to the data block 302 to generate at least a portion of a rights authentication element 330. In an aspect, distinguished encoding rules 331 can be applied to a hash 332 to generate at least a portion of a rights authentication element 330. As an example, the rights authentication element 330 can comprise the hash 332, a distinguished encoding rules (DER) header 334, and padding 336. As a further example, the rights authentication element 330 can be based upon the PKCSv2.1 or another version of the RSA cryptography standard. Other formats and standards can be used.

In an aspect, the hash 332 can be a bit string representing a processed data. As an example, the hash 332 can have a fixed length or a variable length. As a further example, the hash 332 can be a digital fingerprint, checksum, digest, or the like.

In an aspect, the DER header 334 can comprise a result or representation of a set of encrypting rules for processing a data. As an example, the DER header 334 can comprise rules such as length encoding rules, set encoding rules, and encoding form rules. Other data and rules can be stored in the DER header 334.

In an aspect, the padding 336 can be a pre-defined number of bits appended to the hash 332 or bit string. As an example, a block cipher works on units of a fixed size (known as a block size). However messages can have a variety of lengths. Accordingly, padding 336 can be applied to provide a block having a pre-determined length. Any compatible padding and length can be used.

In an aspect, a digital signature 338 (e.g., authenticator) can be applied to a transmitted data for authentication of the data at a receiving end. As an example, the digital signature 338 can be a data quantity, which can be a function of a data object and a secret key that allows a processing entity to verify that only a possessor of the secret key could have generated the digital signature. As a further example, the digital signature can be generated over Conditional Access data or rights data to allow the SOC 122 to verify that the Conditional Access information was generated by an approved source. In an aspect, the digital signature can be generated over certain data items delivered in one or more filtered messages and can be used to verify that the data items were provided by the cable system headend and are valid for the timeframe in which they are used. As an example, the digital signature 338 can be generated using an RSA key such as a level 2 authentication key designated (EM DM) or (EN, DN), where the private key, EM or EN, can be used in the security messaging protocol (SMP) to digitally sign certain data and the corresponding public key, DM or DN, can be used by the software module 124 to verify the authenticity of the signed data. Accordingly, the digital signature 338 can be processed based upon the key (e.g., level 2 authentication key) used to generate the digital signature 338 in order to generate a signature authentication element 340.

In an aspect, the signature authentication element 340 can comprise a hash 342, a distinguished encoding rules (DER) header 344, and padding 346. In an aspect, the hash 342 can be a bit string representing processed data. As an example, the hash 342 can have a fixed length. As a further example, the hash 342 can be a digital fingerprint, checksum, digest, or the like.

In an aspect, the DER header 344 can comprise a set of encrypting rules for processing data. As an example, the DER header 344 can comprise rules such as length encoding rules, set encoding rules, and encoding form rules. Other data and rules can be stored in the DER header 344.

In an aspect, the padding 346 can be a pre-defined number of bits appended to the hash 342 or bit string. As an example, a block cipher works on units of a fixed size (known as a block size). However messages can have a variety of lengths. Accordingly, padding 346 can be applied to provide a block having a pre-determined length. Any padding and length can be used.

In an aspect, the signature authentication element 340 can be compared to the rights authentication element 330 to authenticate the received rights information. As an example, at least one of the signature authentication element 340 and the rights authentication element 330 can be padded such that the signature authentication element 340 and the rights authentication element 330 have an equal length.

As described in greater detail below, authentication of the right identifiers assigned to a particular decoder 120 can be implemented by comparing message digests. However, authentication of other rights and data can be implemented by the systems and methods.

Figure 4:
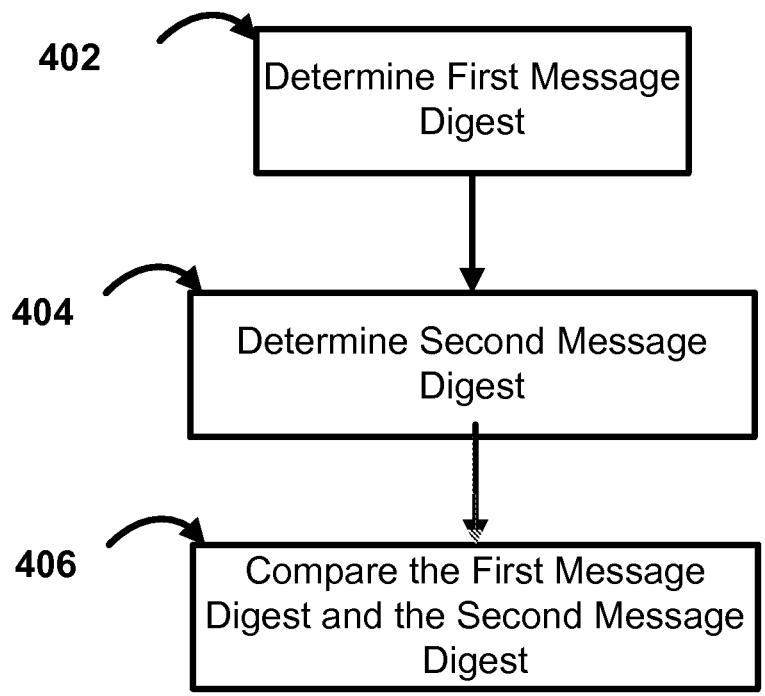
FIG. 4 is a flow chart of an exemplary method of authenticating data.

FIG. 4 illustrates a method for authenticating data. In step 402, data (e.g., data block 302) can be processed to determine a first message digest (e.g., the rights authentication element 330). In an aspect, the first message digest can be generated by applying a secure hash algorithm (e.g., SHA-1) to the data. As an example, the data can be provided/extracted from one or more of the SOC 122, security messaging protocol (SMP) messages that can comprise a unit authorization message (UAM), a Content Control Message (CCM), a common key message (CKM), or the like.

In step 404, an authenticator (e.g., digital signature 338) for a particular decoder 122 can be processed over a data message to generate a second message digest (e.g., the signature rights element 340). As an example, the authenticator can be processed over a data message having the same parameters and data as the data processed in 402. In an aspect, processing the authenticator can comprise decrypting the authenticator using a matched protection key.

In step 406, the first message digest and the second message digest can be compared, wherein matching digests indicates that the underlying data can be from an authenticated source. In an aspect, the authenticated items of the data block 302 and/or the authenticator can be stored in non-volatile memory. As an example, the authenticated items of the data block 302 and/or the authenticator can be stored in a tamper resistant memory. As a further example, the authenticated items of the data block 302 and/or the authenticator can be stored after authentication has succeeded and not replaced there until an updated set of authenticated items and authenticator have been verified, so long as authentication continues to succeed. In an aspect, the authenticator and the authenticated data can be stored in memory associated with the decoder 120 and/or SOC 122, wherein the decoder 120 and/or SOC 122 can verify the authenticated data upon a startup procedure.

As described in greater detail below, a shared key nonce can be generated for the authentication of data in a content delivery network. The systems and methods can authenticate other rights and data in various networks and environments.

Figure 5:
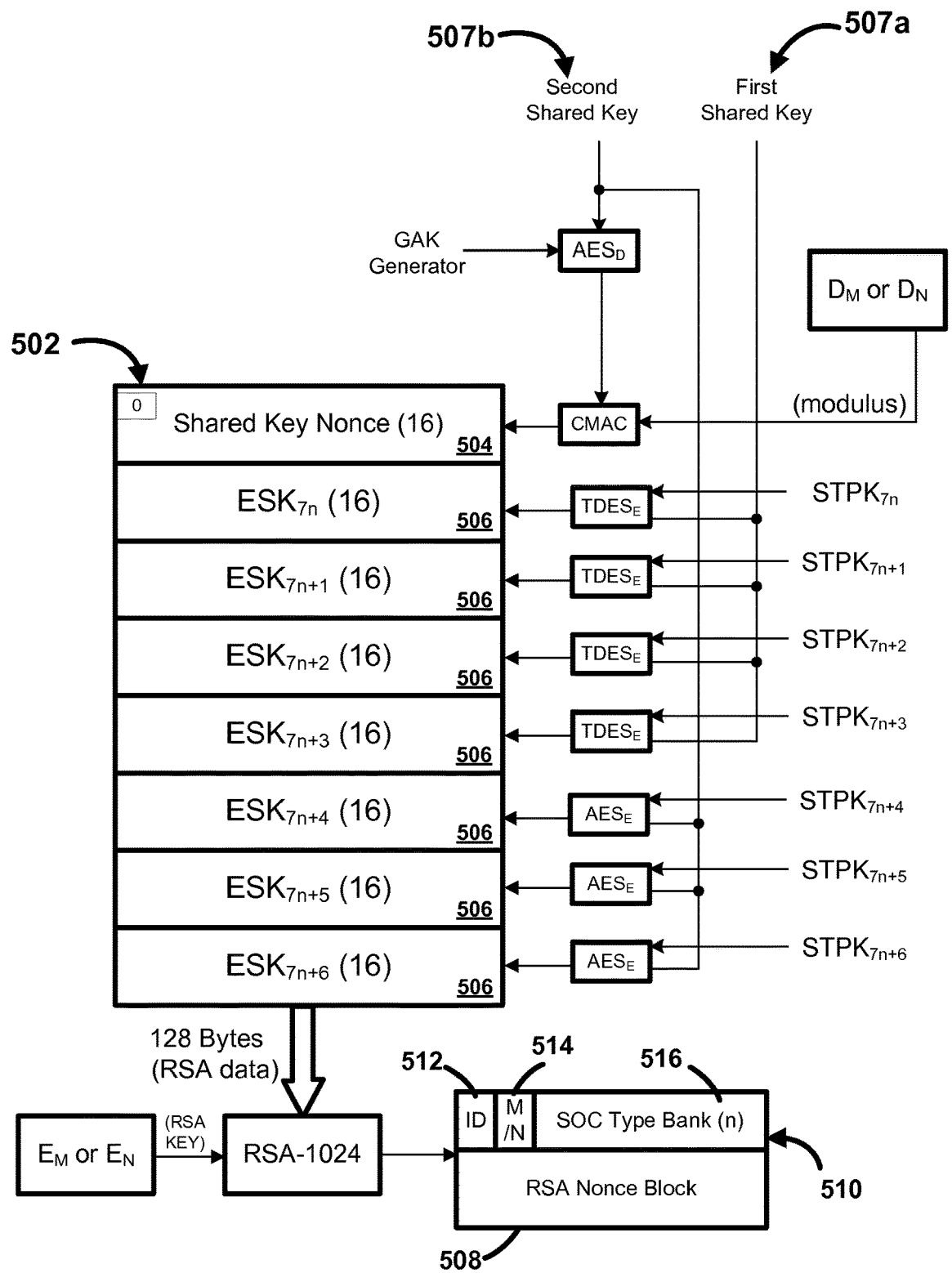
FIG. 5 is a block diagram of an exemplary data and data flow.

FIG. 5 illustrates an exemplary data flow. In an aspect, a first data block 502 can comprise a shared key nonce 504 and a plurality of encrypted shared keys 506.

In an aspect, the shared key nonce 504 can comprise a non-secret value associated with a shared key, such as the shared keys 320, 322, that can be used to authenticate possession of the associated shared key. In an aspect, the shared key nonce 504 can be an arbitrary number used to sign a cryptographic communication. As an example, the shared key nonce 504 can be a random or pseudo-random number issued in an authentication protocol to ensure that old communications cannot be reused in replay attacks. As a further example, the shared key nonce 504 can be progressively changing value, changing based upon a pre-defined time period.

In an aspect, the shared key nonce 504 can be a function of the second shared key 322 and the modulus of an RSA key pair such as a Level 2 authentication key, designated (EM DM) or (EN, DN), where the private key, EM or EN, can be used in the security messaging protocol (SMP) to digitally sign certain data and the corresponding public key, DM or DN, can be used by the software module 124 to verify the authenticity of the signed data. However, other keys can be used to determine/generate the shared key nonce 504. As an example, functions for determining the shared key nonce 504 can comprise: encryption or decryption of the second shared key 322 under a shared key using AES; encryption or decryption of the a shared key or a global authentication key (GAK) derived from the Shared Key under the GAK; generation of a (truncated) SHA hash of a Shared Key under an RSA Key; generation of a cipher-based message authentication code (CMAC) of an RSA Key under the Shared Key, and the like. However, other functions can be used. In an aspect, the shared key nonce 504 can also be implemented as a signature and incorporated into authentication processes such as verifying the rights of the decoder 120. Other authentication procedures can also make use of the shared key nonce 504.

As an example, the shared key nonce 504 can be generated by decrypting a global authentication key (GAK) generator under a shared key in order to generate a global authentication key (GAK). The GAK and the modulus of an authentication key (e.g., an RSA key such as the Level 2 Authentication Key, etc.) are then processed under cipher-based message authentication code (CMAC) to generate the shared key nonce 504. A similar process can be executed at a receiving end in order to generate a comparative authentication nonce for authenticating data.

In an aspect, at least one of the plurality of encrypted shared keys 506 can be generated by encrypting a first shared key 507a using a pre-defined algorithm. As an example, the algorithm can be a triple data encryption standard (TDES) algorithm processed under a protection key such as SOC type protection key (STPK) or a symmetric secret key derived from a control word protection key. As a further example, a different protection key can be used to process the shared key to generate the plurality of encrypted shared keys 506 having different values. Other algorithms can be used, such as an AES algorithm. In an aspect, a plurality of shared keys can be encrypted to generate the encrypted shared keys 506. As an example, different encryption algorithms can be used to generate each of the encrypted shared keys 506, wherein each encryption algorithm used is associated with a particular recipient device (e.g., based on type or classification). As a further example, the shared key used to generate the shared key nonce 504 can be the same shared key that is used to generate one or more of the encrypted shared keys 506.

In an aspect, at least one of the plurality of encrypted shared keys 506 can be generated by encrypting a second shared key 507b using a pre-defined algorithm. As an example, the algorithm can be a AES algorithm processed under a protection key such as SOC type protection key (STPK) or a symmetric secret key derived from a control word protection key. As a further example, a different protection key can be used to process the shared key to generate the plurality of encrypted shared keys 506 having different values. Other algorithms can be used, such as TDES algorithm. In an aspect, a plurality of shared keys can be encrypted to generate the encrypted shared keys 506. As an example, different encryption algorithms can be used to generate each of the encrypted shared keys 506, wherein each encryption algorithm used is associated with a particular recipient device (e.g., based on type or classification). As a further example, the shared key used to generate the shared key nonce 504 can be the same shared In an aspect, the data block 502 can be processed to generate an encrypted element 508 or nonce block. As an example, the encrypted element 508 can be a data encrypted by an RSA key such as a Level 2 authentication key. In an aspect, the encrypted element 508 can be used to populate a second data block 510. As an example, the second data block 510 can be transmitted to a recipient device for authenticating a data, as described herein.

In an aspect, the second data block 510 can comprise a shared key identifier 512, a public key parity 514, a type bank 516, and the encrypted element 508. As an example, the data block 510 can be populated from information transmitted in a common key message (CKM). As a further example, transport methods and messages can be used to deliver the data block 510 such as the security messaging protocol (SMP) messages that can comprise a unit authorization message (UAM), a Content Control Message (CCM), a common key message (CKM), or the like. As a further example, the data block 510 can be transmitted to the decoder 120 and/or SOC 122 for authentication.

In an aspect, the shared key identifier 512 can comprise a character or characters (e.g., sequence number) used by a processor (e.g., the decoder 120, the SOC 122, the software module 124, etc.) to identify a shared key and values associated with the shared key. In an aspect, the shared key identifier 512 can be used to distinguish one shared key from other shared keys. As an example, the shared key identifier 512 can be used by a processor to apply the appropriate shared key to a particular data for processing such as encryption, decryption, authentication, or the like.

In an aspect, the public key parity 514 can comprise an identifier to indicate a select public key to be used in authentication. As an example, the public key parity 514 can be an identifier such as a character (e.g., M or N). As a further example, the public key parity 514 can be used by a processor to apply the appropriate public key (e.g., RSA key such as the Level 2 Authentication Key or the like) to a particular data for processing such as encryption, decryption, authentication, and the like.

In an aspect, the type bank 516 can comprise a character or characters (e.g., sequence number) identifying a type or classification of the recipient device (e.g., SOC 122). As an example, the type of the SOC 122 that receives the second data block 510 can be extracted from the SOC 122 or some memory in order to identify which encrypted shared key of the plurality of encrypted shared keys 506 can be to be used for authentication. As an example, the type bank 516 can be relied upon by a processor to apply the appropriate shared key to a particular data for processing such as encryption, decryption, authentication, and the like.

As described in greater detail below, a nonce can be generated for the authentication of data based upon a shared key. In an aspect, the shared key and the nonce can be transmitted to a recipient device as an encrypted authentication data block for authentication processing.

Figure 6:
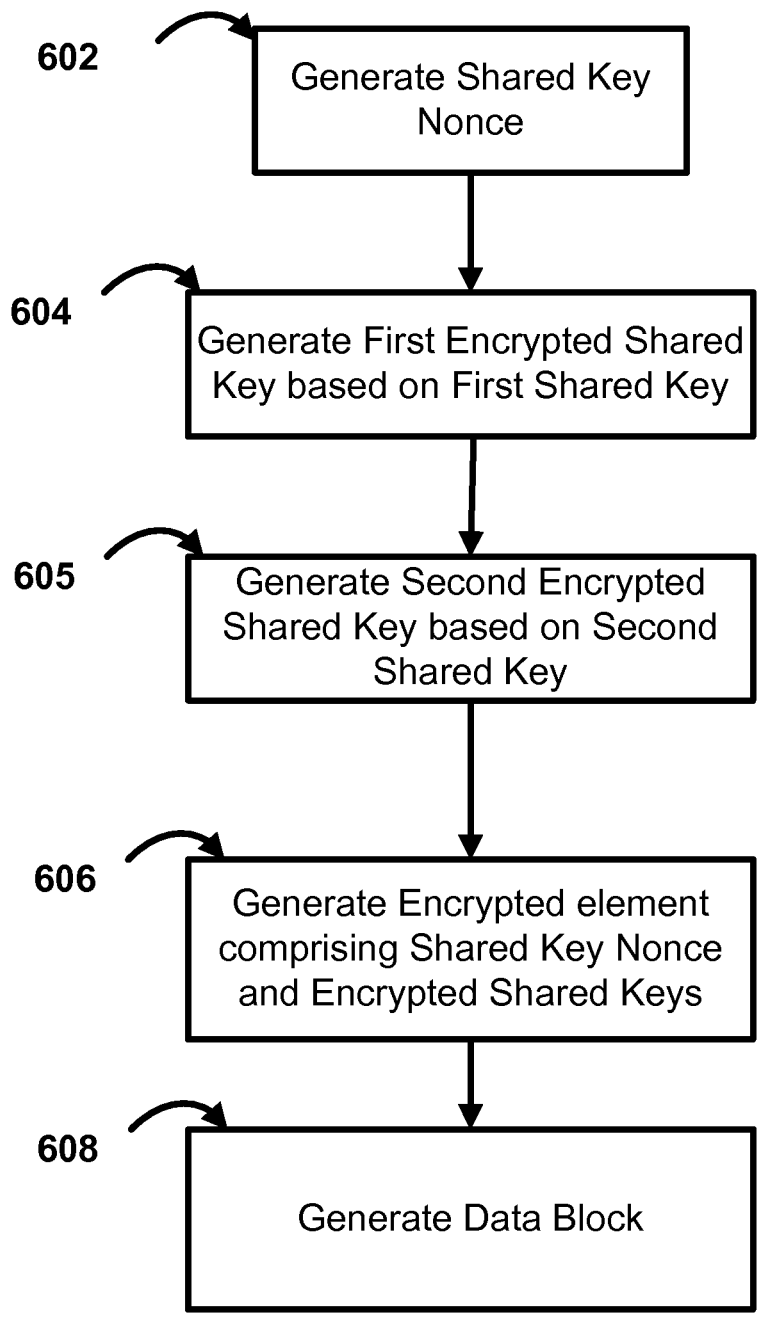
FIG. 6 is a flow chart of an exemplary method of generating authentication data.

FIG. 6 illustrates a method for generating an authentication data. In step 602, a shared key nonce (e.g., shared key nonce 504) can be generated. As an example, the shared key nonce can be a function of a shared key and an authentication key such as an RSA key. As a further example, the shared key nonce can be a function of a shared key and the modulus of a Level 2 authentication key. However, other functions and keys can be used.

In step 604, a first encrypted shared key can be generated. As an example, the first encrypted shared key can be generated by processing a shared key (e.g., the first shared key 507a) under an encryption algorithm such as TDES. However, other encryption algorithms can be used. As a further example, any number of shared keys can be encrypted to generate any number of first encrypted shared keys (e.g., encrypted shared keys 506). In an aspect, the encrypted shared key(s) can be generated based upon an intended recipient device such as SOC 122 having a particular SOC type or classification.

In step 605, a second encrypted shared key can be generated. As an example, the second encrypted shared key can be generated by processing a shared key (e.g., the second shared key 507b) under an encryption algorithm such as AES. However, other encryption algorithms can be used. As a further example, any number of shared keys can be encrypted to generate any number of encrypted shared keys (e.g., encrypted shared keys 506). In an aspect, the second encrypted shared key(s) can be generated based upon an intended recipient device such as SOC 122 having a particular SOC type or classification. As an example, the second encrypted shared key is associated with a different SOC type than the first encrypted shared key.

In step 606, the shared key nonce and the first and second encrypted shared keys are processed to generate an encrypted element (e.g., the encrypted element 508). As an example, the shared key nonce and the encrypted shared keys are encrypted under an authentication key such as an RSA key. As a further example, the shared key nonce and the encrypted shared key are encrypted under the authentication key used to generate the shared key nonce. However, other processing and encryption methods can be used to generate the encrypted element.

In step 608, a data block (e.g., second data block 510) can be generated to transport the encrypted element and/or other data. As an example, the data block can comprise unencrypted information for processing the encrypted element. As a further example, the data block can be populated from other messages and devices in order to process the encrypted element at a recipient device.

As described in greater detail below, data can be authenticated by comparing a generated authentication code or nonce and a shared key nonce. In an aspect, a bandwidth can be minimized by using the shared key nonce to authenticate data over a variety of recipient device types. However, authentication of other rights and data can be implemented by the systems and methods.

Figure 7:
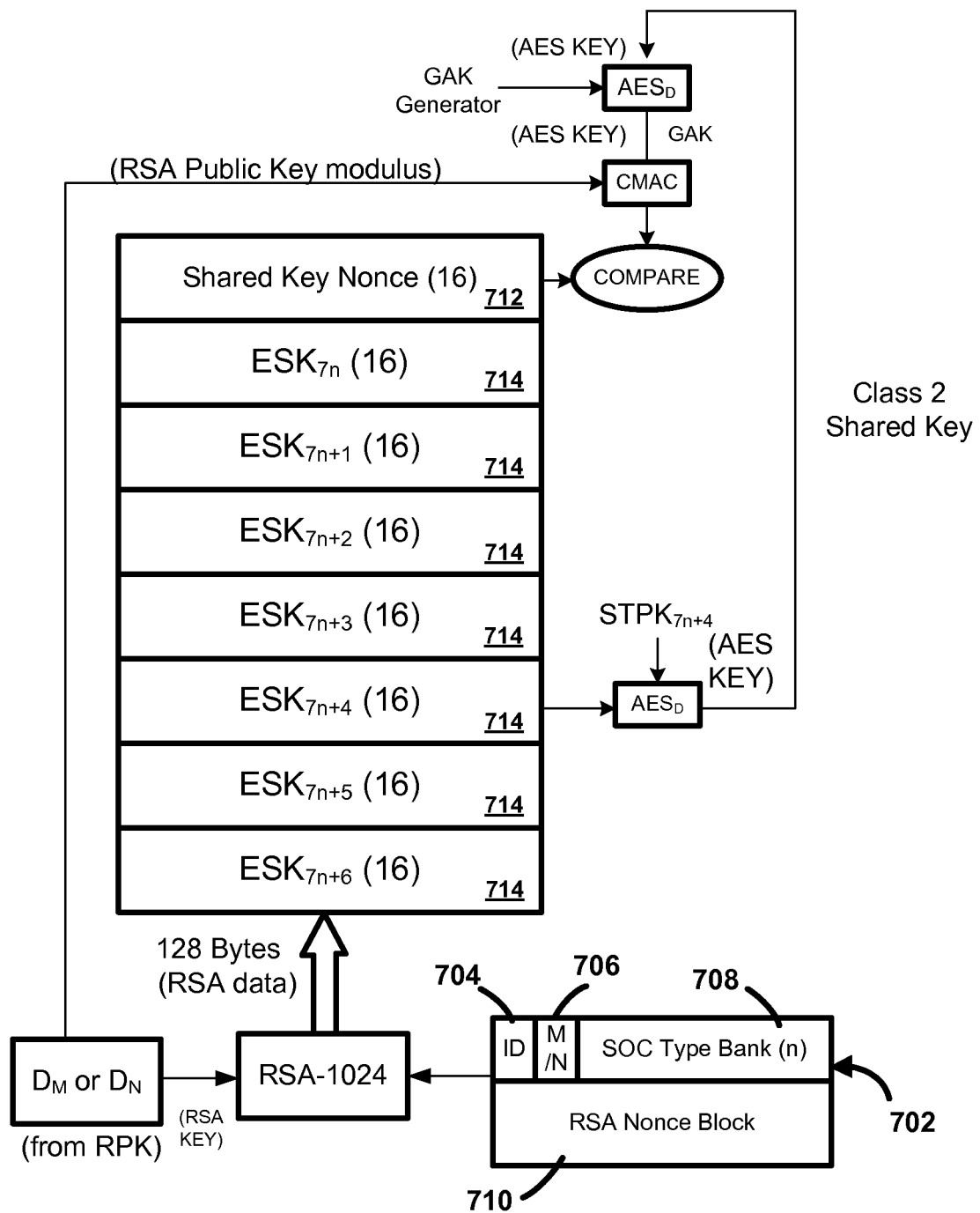
FIG. 7 is a block diagram of an exemplary data and data flow.

FIG. 7 illustrates an exemplary data flow. In an aspect, a data block 702 can comprise a shared key identifier 704, a public key parity 706, a type bank 708, and a nonce block 710. As an example, the data block 702 can be populated from information transmitted in a common key message (CKM). As a further example, transport methods and messages can be used to deliver the data block 702 such as a security messaging protocol (SMP) messages that can comprise a unit authorization message (UAM), a Content Control Message (CCM), a common key message (CKM), and the like. As a further example, the data block 702 can be transmitted to the decoder 120 and/or SOC 122 for authentication.

In an aspect, the shared key identifier 704 can comprise a character or characters (e.g., sequence number) used by a processor (e.g., the decoder 120, the SOC 122, the software module 124, etc.) to identify a shared key and values associated with the shared key. In an aspect, the shared key identifier 704 can be used to distinguish one shared key from other shared keys. As an example, the shared key identifier 704 can be used by a processor to apply the appropriate shared key to a particular data for processing, such as encryption, decryption, authentication, or the like.

In an aspect, the public key parity 706 can comprise an identifier to indicate a select public key to be used in authentication. As an example, the public key parity 706 can be an identifier such as a character (e.g., M or N). As a further example, the public key parity 706 can be used by a processor to apply the appropriate public key (e.g., RSA key, Level 2 Authentication Key, or the like) to a particular data for processing such as encryption, decryption, authentication, and the like.

In an aspect, the type bank 708 can comprise a character or characters (e.g., sequence number) identifying a type or classification of the recipient device (e.g., SOC 122). As an example, the type of the SOC 122 that receives the data block 702 can be extracted from the SOC 122 or some memory in order to identify which encrypted shared key of a plurality of encrypted shared keys can be used for authentication. As an example, the type bank 708 can be relied upon by a processor to apply the appropriate shared key to a particular data for processing such as encryption, decryption, authentication, or the like. As a further example, the type bank 708 can be relied upon to select an encrypted shared key to process for authentication.

In an aspect, the nonce block 710 can comprise an encrypted information or element. Accordingly, upon receiving and decrypting the encrypted information, at least a shared key nonce 712 and at least one of a plurality of encrypted shared keys 714 can be retrieved from the encrypted information. The nonce block 710 can store other data.

As described in greater detail below, methods are provided to minimize a bandwidth required for the transmission of authentication messages by using a shared key nonce to authenticate data over a variety of recipient device types. However, authentication of other rights and data can be implemented by the systems and methods.

Figure 8:
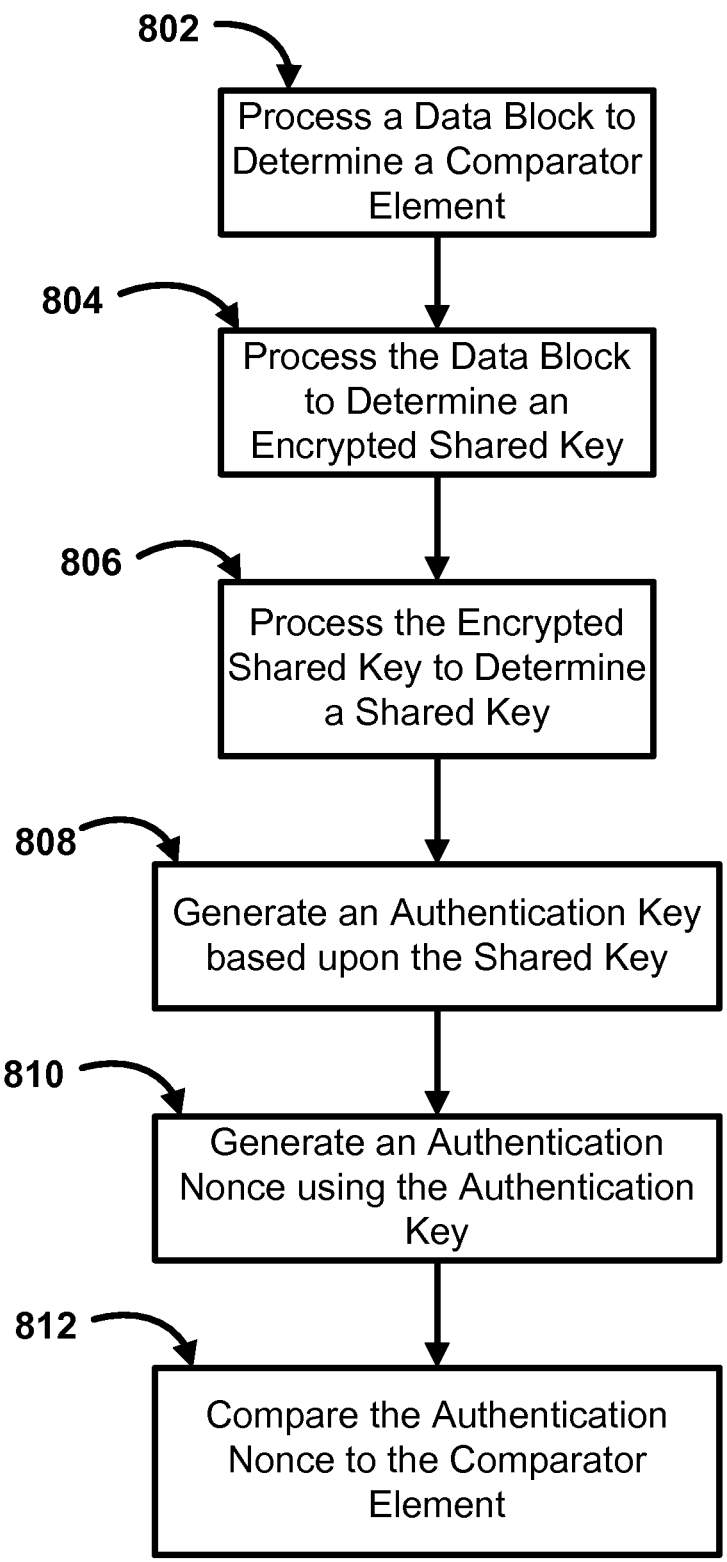
FIG. 8 is a flow chart of an exemplary method of authenticating data.

FIG. 8 illustrates a method for authenticating data. In step 802, a recipient device processes at least a portion of the data block 702 to extract information such as a comparator element (e.g., the shared key nonce 712). As an example, a recipient device such as the software module 124 can use parameter recovery processing in the SOC 122 to process the nonce block 710 to uncover/extract the shared key nonce 712 associated with the shared key identifier 704.

In step 804, the recipient device process the data block 702 to extract information such as one or more of the encrypted shared keys 714. As an example, a recipient device such as the software module 124 can use parameter recovery processing in the SOC 122 to process the nonce block 710 to uncover/extract the one or more of the encrypted shared keys 714 based upon information in the type bank 708. In an aspect, a recipient device such as the software module 124 extracts one or more of the following: the one of the encrypted shared keys 714 for the associated SOC Type; an associated STPK Generator; a GAK Generator, a value embedded in a SCM Code; the shared key nonce; the Level 2 Authentication public key used to uncover the RSA Nonce Data Block.

In step 806, one or more of the encrypted shared keys 714 can be processed to determine/uncover a shared key. As an example, the one of the encrypted shared keys 714 associated with the value identified in the type bank 708 can be decrypted using the STPK generator uncovered in step 804. In an aspect, the STPK generator is based upon the particular protection key used to encrypt the shared key associated with the with the value identified in the type bank 708. In this way, each recipient device can have a particular encrypted shared key 714 associated therewith for authentication. As a further example one or more of the encrypted shared keys 714 can be decrypted using the AES algorithm under a protection key, such as STPK, UPK, or the like.

In step 808, the shared key uncovered in step 806 can be used to generate an authentication key. As an example, a global authentication key (GAK) can be generated by decrypting a GAK generator under the shared key using the AES algorithm. In an aspect, the GAK required for timeliness authentication can be different from the GAK used for the authentication of service access requirements illustrated in FIG. 3. Other authentication keys can be used.

In step 808, the GAK and at least portion of an authentication key are processed under a cipher-based message authentication code CMAC algorithm to generate an authentication nonce. In an aspect, a modulus of a Level 2 authentication key and the GAK are processed under a CMAC algorithm to generate a result that can be used as the authentication nonce. As an example, the authentication nonce can be the direct result of the CMAC processing. As a further example, the authentication nonce can be a function of the CMAC.

In step 810, the authentication nonce can be compared to the comparator element (e.g., the shared key nonce 712). Other comparator elements and values can be used to authenticate the authentication nonce. As an example, if the authentication nonce is equal to the shared key nonce 712 (with the possible exception of the most significant bit (msb)), the software module 124 can accept the shared key nonce 712 as valid. As an example, where a Level 2 Authentication key is used to generate the authentication nonce and the authentication nonce is equal to the shared key nonce 712, the Level 2 Authentication key can be deemed valid. As an example, once the shared key nonce 712 is deemed valid, an authentication of rights can be implemented, as shown in FIGS. 3-4. As a further example, the authentication of rights can process control words that have been encrypted under the shared key associated with the shared key nonce 712. However, other authentication processes and keys can be used.

In an aspect, the most significant bit (msb) of the shared key nonce 712 can be forced to zero before it is covered by the authentication key so that the value of the covered data block is less than the value of a modulus of the authentication key. Accordingly, the shared key nonce 712 can differ from the authentication nonce resulting in an erroneous invalidation of the shared key nonce 712. As an example, a pre-determined number of bits can be selected from the CMAC output (e.g., the authentication nonce) for comparison to the shared key nonce 712, thereby minimizing the erroneous invalidation of the shared key nonce 712 due to the msb. As a further example, the software module 124 can process the authentication nonce twice, once with the msb of the shared key nonce 712 set to zero and a second time with the msb of the shared key nonce 712 set to one. Other methods to minimize erroneous invalidation of the shared key nonce 712 can be used.

In an aspect, when an authentication key (e.g., the Level 2 authentication key) needs to be changed or updated, the parity identifier (i.e. M or N) of the authentication key can be changed to the parity that is not currently in use. As an example, when a shared key or authentication key parity is updated, the new values can be distributed in advance of the UAMs that contain authenticators (e.g., digital signature 330) for rights authentication. As a further example, in order to ensure that a recipient device (e.g., decoder 120, SOC 122, etc.) can continue to access services if shared key authentication is required in the meantime, e.g., after a power cycle, the software module 124 can maintain both the old and new values of the encrypted shared keys and the shared key nonces in association with the shared key identifier and the parity of the authentication key. Accordingly, when the recipient device receives a UAM with updated shared key identifier and/or authentication key or public key parity, the software module 124 verifies the authenticator using the shared key, shared key nonce and authentication key received in the UAM. If and when verification is successful, the software module 124 can discard the old values. In an aspect, if a shared key nonce were not generated and used in the CKM then the UAM would need to include a data block for each encrypted shared key that is part of the CKM. That means as the number of SOC Types and required encrypted shared keys increases, the size of the UAM and the required bandwidth would increase. Accordingly, the generation and use of the shared key nonce as an authenticator over a variety of recipient device types can minimize a required bandwidth in the transmission of authentication information.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   determining, by a computing device, based on a first secret element and a first recipient device class of a plurality of recipient device classes, a first encrypted secret element;
   determining, by the computing device, based on a second secret element provided to each recipient device of each recipient device class of the plurality of recipient device classes, a non-secret element that associates the first secret element with the first recipient device class and with a shared key of a plurality of shared keys, wherein each shared key of the plurality of shared keys is provided to each recipient device of each recipient device class of the plurality of recipient device classes, and wherein each shared key of the plurality of shared keys corresponds to a distinct recipient device class of the plurality of recipient device classes; and
   determining, by the computing device, based on the first encrypted secret element and the non-secret element, an encrypted data block comprising the first encrypted secret element and the non-secret element.

2. The method of claim 1, wherein the first secret element is a shared key of the plurality of shared keys.

3. The method of claim 1, wherein determining the first encrypted secret element comprises encrypting the first secret element using a protection key based on the first recipient device class of the plurality of recipient device classes.

4. The method of claim 1, wherein the second secret element is a shared key of the plurality of shared keys.

5. The method of claim 1, wherein determining the non-secret element comprises processing a first authentication key generator using the second secret element to generate a first authentication key, wherein the non-secret element is a function of the first authentication key.

6. The method of claim 1, wherein determining the non-secret element comprises processing a first authentication key and a second authentication key to generate a cipher-based message authentication code, wherein the non-secret element is based on the cipher-based message authentication code.

7. The method of claim 1, wherein the non-secret element is a shared key nonce.

8. The method of claim 1, wherein determining the encrypted data block comprises encrypting the first encrypted secret element and the non-secret element using an authentication key.

9. A method comprising:
   encrypting, by a computing device, a first shared key based on a first recipient device class of a plurality of recipient device classes to generate an encrypted first shared key;
   encrypting, by the computing device, a second shared key based on each of the plurality of recipient device classes to generate an encrypted second shared key;
   determining, by the computing device, based on the encrypted second shared key, a non-secret element that is provided to each recipient device of each recipient device class of the plurality of recipient device classes and associates the first shared key with a plurality of shared keys, wherein each shared key of the plurality of shared keys is provided to each recipient device of each recipient device class of the plurality of recipient device classes, and wherein each shared key of the plurality of shared keys corresponds to a distinct recipient device class of the plurality of recipient device classes; and
   determining, by the computing device, an encrypted data block based on the encrypted first shared key, the encrypted second shared key, and the non-secret element.

10. The method of claim 9, wherein the first shared key is encrypted using a protection key based on the first recipient device class of the plurality of recipient device classes.

11. The method of claim 9, wherein the second shared key is encrypted using a protection key based on each of the plurality of recipient device classes.

12. The method of claim 9, wherein determining the non-secret element comprises processing a first authentication key generator using the second shared key to generate a first authentication key, wherein the non-secret element is a shared key nonce, and wherein the non-secret element is a function of a modulus of the first authentication key.

13. The method of claim 12, wherein determining the non-secret element comprises processing the first authentication key and a second authentication key to generate a cipher-based message authentication code, wherein the non-secret element is based on the cipher-based message authentication code.

14. The method of claim 9, wherein the first shared key is associated with the first recipient device class of the plurality of recipient device classes.

15. The method of claim 14, wherein the second shared key is associated with each of the plurality of recipient device classes.

16. The method of claim 9, wherein determining the encrypted data block comprises encrypting the encrypted first shared key, the encrypted second shared key, and the non-secret element using an authentication key, and wherein the non-secret element is generated as a function of the authentication key, and wherein the encrypted data block comprises the encrypted first shared key, the encrypted second shared key, and the non-secret element.

17. A method comprising:
  determining, by a computing device, based on a data block comprising a plurality of encrypted shared keys, a shared key nonce, wherein each shared key of the plurality of encrypted shared keys is provided to each recipient device of each recipient device class of a plurality of recipient device classes;
  determining, by the computing device, based on the data block, a first shared key of the plurality of encrypted shared keys associated with a first identifier, wherein each shared key of the plurality of encrypted shared keys is encrypted based on a distinct recipient device class of the plurality of recipient device classes, and wherein the shared key nonce associates each shared key of the plurality of encrypted shared keys with a corresponding recipient device class of the plurality of recipient device classes;
  determining a first authentication key based on the first shared key;
  determining an authentication nonce using the first authentication key; and
  determining, based on a comparison of the authentication nonce to the shared key nonce, an authentication.

18. The method of claim 17, wherein determining the shared key nonce comprises decrypting the shared key nonce using an RSA level 2 authentication key.

19. The method of claim 17, wherein the shared key nonce is a function of the first shared key and an RSA level 2 authentication key.

20. The method of claim 17, wherein the first identifier is a class of the plurality of recipient device classes that is associated with the data block.

* * * * *